United States Patent
Sagi

(10) Patent No.: US 6,807,187 B1
(45) Date of Patent: Oct. 19, 2004

(54) METHOD AND APPARATUS FOR DETERMINING A NEXT ROUND ROBIN ELEMENT USING A CASCADED APPROACH

(75) Inventor: Dalit Sagi, Ramat Hagolan (IL)

(73) Assignee: Cisco Technology, Inc., San Jose, CA (US)

(*) Notice: Subject to any disclaimer, the term of this patent is extended or adjusted under 35 U.S.C. 154(b) by 733 days.

(21) Appl. No.: 09/676,261

(22) Filed: Sep. 28, 2000

(51) Int. Cl.[7] .................. G06F 13/00; H04L 12/28; H04L 12/66
(52) U.S. Cl. .................. 370/419; 370/463; 711/111
(58) Field of Search .................. 370/395.4, 412–419, 370/461, 462, 463; 710/111

(56) References Cited

U.S. PATENT DOCUMENTS

| | | | | |
|---|---|---|---|---|
| 5,155,854 A | * | 10/1992 | Flynn et al. | 709/104 |
| 5,546,548 A | * | 8/1996 | Chen et al. | 710/116 |
| 5,666,488 A | * | 9/1997 | Joh | 709/253 |
| 5,729,702 A | | 3/1998 | Creedon et al. | |
| 5,832,278 A | * | 11/1998 | Pham | 710/243 |
| 5,881,313 A | * | 3/1999 | Ramakrishnan et al. | 710/40 |

* cited by examiner

Primary Examiner—Hassan Kizou
Assistant Examiner—Timothy Lee
(74) Attorney, Agent, or Firm—The Law Office of Kirk D. Williams

(57) ABSTRACT

Methods and apparatus are disclosed for determining a next round robin element requesting service using a cascaded approach. The cascaded approach could be implemented in numerous ways, including, inter alia, a circuit or in software, and be used, inter alia, in a network or computer system. In one implementation, a first stage of the cascaded implementation is divided into multiple groups, each of the multiple groups receives an indication of elements requesting service. Based on a last round robin result and its address, each of the multiple groups determines a candidate for the next result. In the situation where the last result was in a group and the group has a requesting element subsequent in the round robin sequence, that next requesting element is selected and forced to be the selected next result. Otherwise, this processing is repeated by subsequent stages to determine the round robin result. One implementation selects a next result from 4096 requesting inputs within a single clock period using three sixteen input cascaded stages.

7 Claims, 9 Drawing Sheets

METHOD AND APPARATUS FOR DETERMINING A NEXT ROUND ROBIN ELEMENT USING A CASCADED APPROACH

FIELD OF THE INVENTION

This invention relates to communications and computer systems; more particularly, the invention relates to determining a next round robin element using a cascaded approach.

BACKGROUND OF THE INVENTION

The communications industry is rapidly changing to adjust to emerging technologies and ever increasing customer demand. This customer demand for new applications and increased performance of existing applications is driving communications network and system designs, and resulting the in the development of faster and more powerful communications devices.

A network device, such as a router or packet switching system, is used in many networks to send traffic from multiple inputs to one or more outputs. The number of elements connected to a network device requesting service is greatly increasing because of enhanced customer demand as well as faster technology which allows the servicing of significantly more elements by a single device. For example, an edge router or packet switch may now wish to service thousands of connected elements having traffic to send.

However, in many cases, only a single element may be serviced at a time by a network element or one of its components, such as a line card. When elements are of a same priority, a round robin technique is commonly used to service these elements in a fair way. If all elements are to be serviced each time, a simple wrap-around counter increased after an element is serviced can be used to identify which element to service at a give time. However, if some elements do not need servicing, such a counter technique can waste a transmission cycle for each element not needing servicing, which may cause poor performance. The exact performance would depend on the occupancy rate of the elements. The counter round robin technique could be adapted to increase the counter if an element does not require servicing, however, such a technique typically cannot guarantee finding the next element to service within a transmission period or clock time, especially with a high number of inputs and/or fast transmission rate.

Another implementation of the round robin technique to accommodate a subset of the elements needing servicing includes a circuit which identifies the current element to service. Such conventional circuits are reasonable to implement when there are a relatively few number of inputs to choose between, such as on the order on tens of elements. However, as the number of elements to service becomes large, the circuitry becomes overwhelming large and has a very slow critical time path, which may exceed a transmission cycle or clock time.

Needed are new methods and apparatus for determining which element to service using a round robin technique, especially when a subset of the elements may not need servicing at any given time.

SUMMARY OF THE INVENTION

A cascaded circuit is used to identify a next element in a round robin sequence. Multiple first stage elements receive an indication of a last selected element and one or more indication signals of elements requesting selection. These elements requesting selection are a subset of the elements which may request selection. Each of the first stage elements includes an identification circuit to identify one of the requesting elements to a second stage element. The second stage element, coupled to the multiple first stage elements, receives an indication of either the last selected element or the first stage element coupled to the last selected element. The second stage element includes a selection circuit to select the next element from among the elements requesting selection identified by the first stage elements.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for determining a next round robin element using a cascaded approach. This cascaded approach can be used when all elements are always available for servicing, or when some of the elements are temporarily or permanently unavailable for servicing. The cascaded approach could be implemented in numerous ways, including, inter alia, a circuit or in software, and be used, inter alia, in a network or computer system. In one implementation, a first stage of the cascaded implementation is divided into multiple groups, each of the multiple groups receives an indication of elements requesting service. Based on a last round robin result and its address, each of the multiple groups determines a candidate for the next result. In the situation where the last result was in a group and the group has a requesting element subsequent in the round robin sequence, that next requesting element is selected and forced to be the selected next result. Otherwise, this processing is repeated by subsequent stages to determine the round robin result. One implementation selects a next result from 4096 requesting inputs within a single clock period using three sixteen input cascaded stages.

Embodiments described herein include various elements and limitations, with no one element or limitation contemplated as being a critical element or limitation. Each of the claims individually recite an aspect of the invention in its entirety. Moreover, some embodiments described may include, inter alia, systems, integrated circuit chips, methods, and computer-readable medium containing instructions. The embodiments described herein embody various aspects and configurations within the scope and spirit of the invention.

Figure 1A:
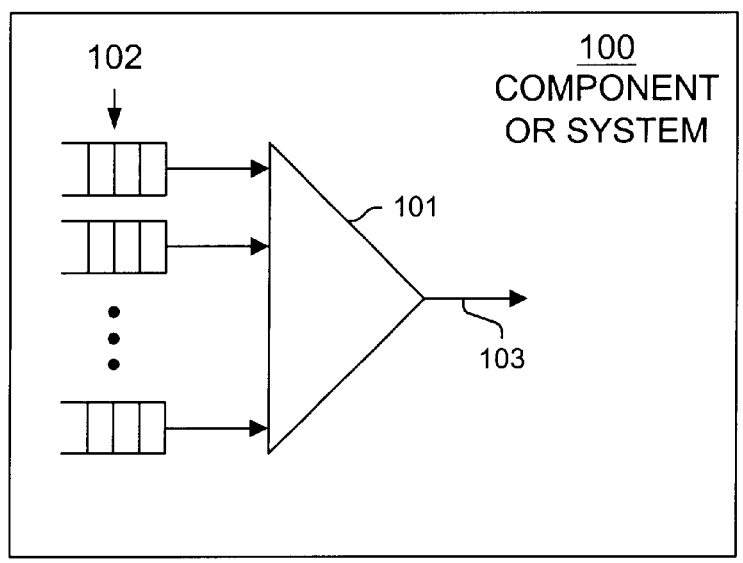
FIGS. 1A–B are a block diagrams of two of many possible operating environments of the invention.
Figure 1B:
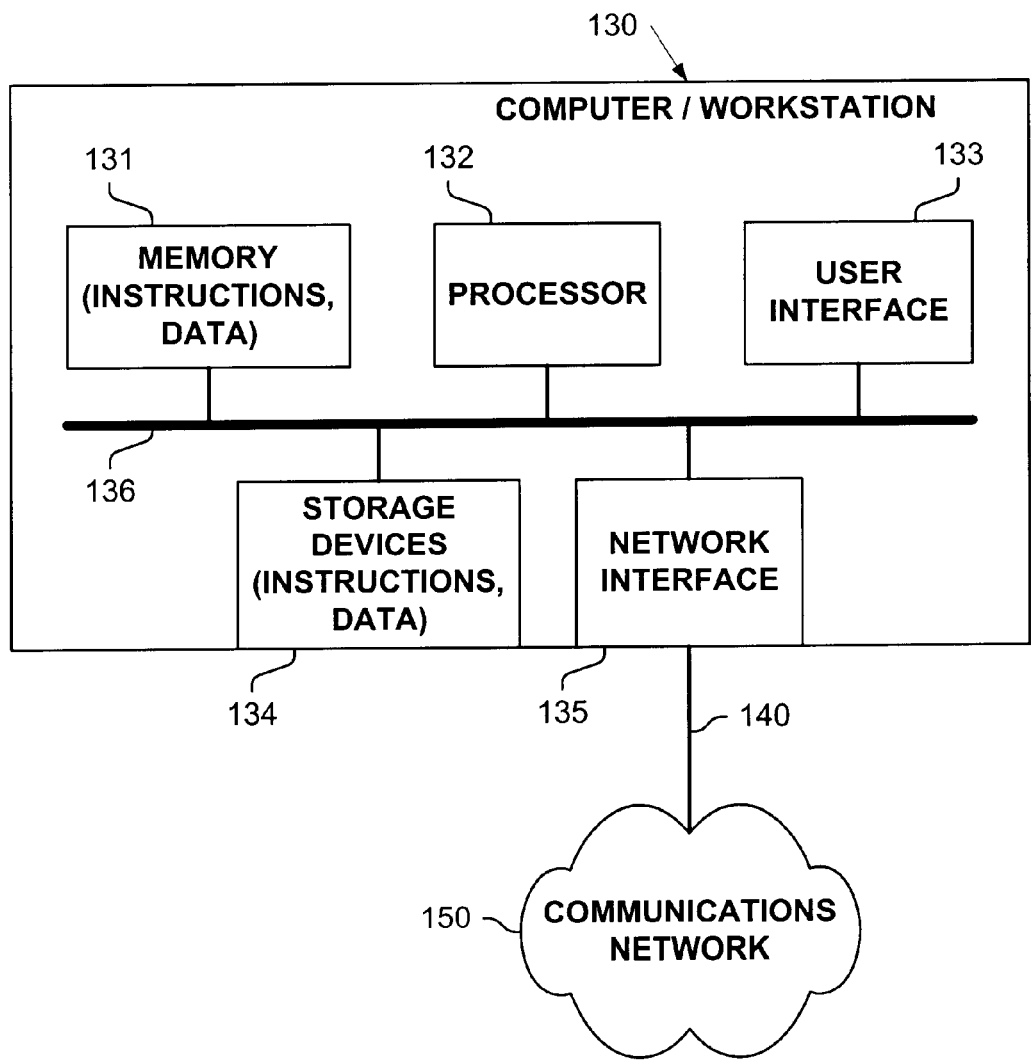

FIGS. 1A–B and their discussions herein are intended to provide a description of a general computing and/or network environment in which the present invention can be practiced. In one embodiment in hardware and/or software, the elements serviced include queues of a network device, such as a router or packet switching system. In one embodiment in hardware and/or software, the elements are part of a computer system. These methods and apparatus are not limited to a single networked device or packet switching environment. Rather, the architecture and functionality taught herein are extensible to an unlimited number of devices (including standalone devices and embedded components of other devices, etc.), systems, packet switching environments, and embodiments in keeping with the scope and spirit of the invention. Moreover, the present invention provides for various methods, computer-readable medium containing computer-executable instructions, and apparatus for pacing the flow of information from a device.

FIG. 1A illustrates an exemplary operating environment and embodiment of the present invention. Illustrated is component or system 100, which may be part of a computer or communications system, such as, but not limited to, a router, network device, switching device, or transmission device. Candidates 102 for servicing are shown for illustrative purposes as queues. Device 101 determines the next candidate 102 to select, and indicates availability, or possibly sends information, such as in the form of a packet, on link 103. Link 103 may connect to other components or elements of component or system 100, or to an external network, device, or system.

FIG. 1B illustrates another exemplary operating environment and embodiment of the present invention. Device 130 may comprise a standard computer platform or a specialized computer platform, including, but not limited to a desktop computer, a laptop computer, personal data assistant, a handheld computer. Device 130 could also be a component of a larger device, with device 130 having some or all of the illustrated elements 131–135. In one embodiment, device 130 comprises a processor 132, memory 131, storage devices 134, a network interface 135, and a user interface component 133 (e.g., interface(s) to a monitor, keyboard, mouse, etc.), which are electrically coupled via one or more communications mechanisms 136 (shown as a bus for illustrative purposes). Network interface 135 is connected to a communications network 150 (e.g., one or more networks, including, but not limited to the Internet, private or public telephone, cellular, wireless, satellite, cable, local area, metropolitan area and/or wide area networks) over connection 140. Memory 131 is one type of computer-readable medium, and typically comprises random access memory (RAM), read only memory (ROM), integrated circuits, and/or other memory components. Memory 131 typically stores computer-executable instructions to be executed by processor 132 and/or data which is manipulated by processor 132 for implementing functionality in accordance with the present invention. Storage devices 134 are another type of computer-readable medium, and typically comprise disk drives, diskettes, networked services, tape drives, and other storage devices. Storage devices 134 typically store computer-executable instructions to be executed by processor 132 and/or data which is manipulated by processor 132 for implementing functionality in accordance with the present invention. Additionally, device 130 and communications network 120 could be implemented as part of a single computer platform, with communications network 150 being an internal information sharing mechanism such as message passing or shared memory.

As used herein and contemplated by the present invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 2A:
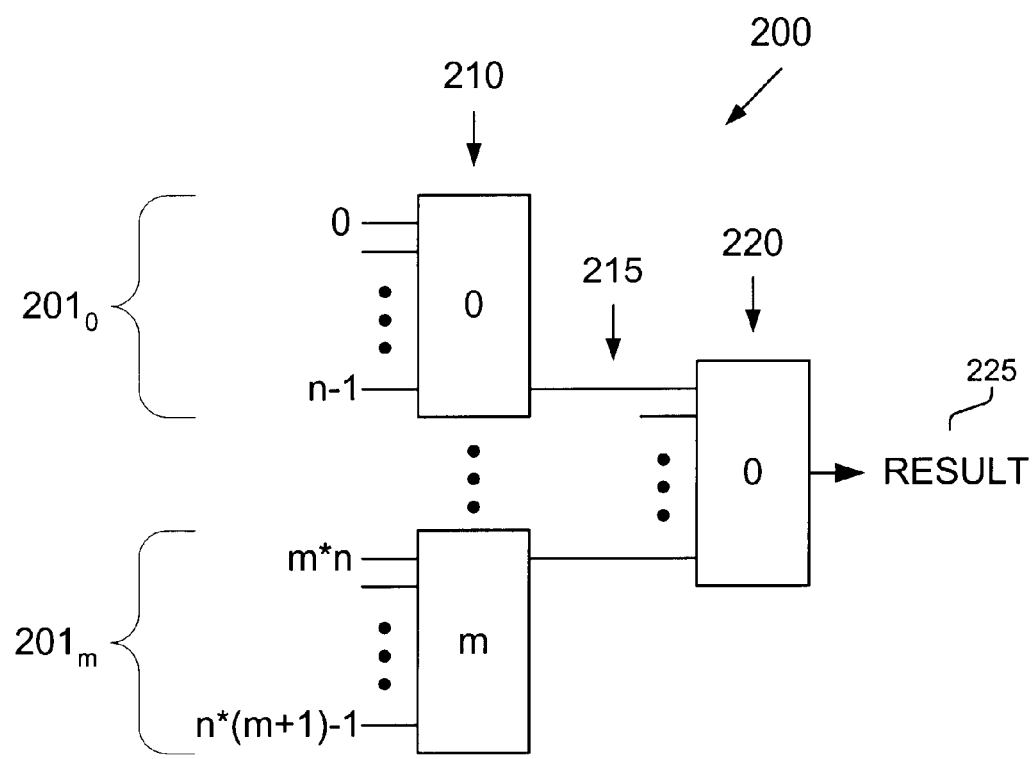
FIGS. 2A–B are block diagrams of exemplary cascaded circuits.

FIG. 2A illustrates one embodiment comprising a two-stage cascaded circuit 200. First stage 210 is divided into m components/groups of requesting elements/candidates $201_{0\text{-}m}$. In one embodiment, each component 210 is coupled to the same maximum number n requesting elements. Each component 210 is coupled, directly via links 215 (or indirectly) to second stage 220. In exemplary circuit 200, there is a single second stage component 220 which receives signals from the components of the first stage 210, and determines and indicates result 225, which indicates a next requesting elements/candidates $201_{0\text{-}m}$ in the round robin sequence, typically, although not required by the invention, ignoring non-requesting elements/candidates $201_{0\text{-}m}$.

Figure 2B:
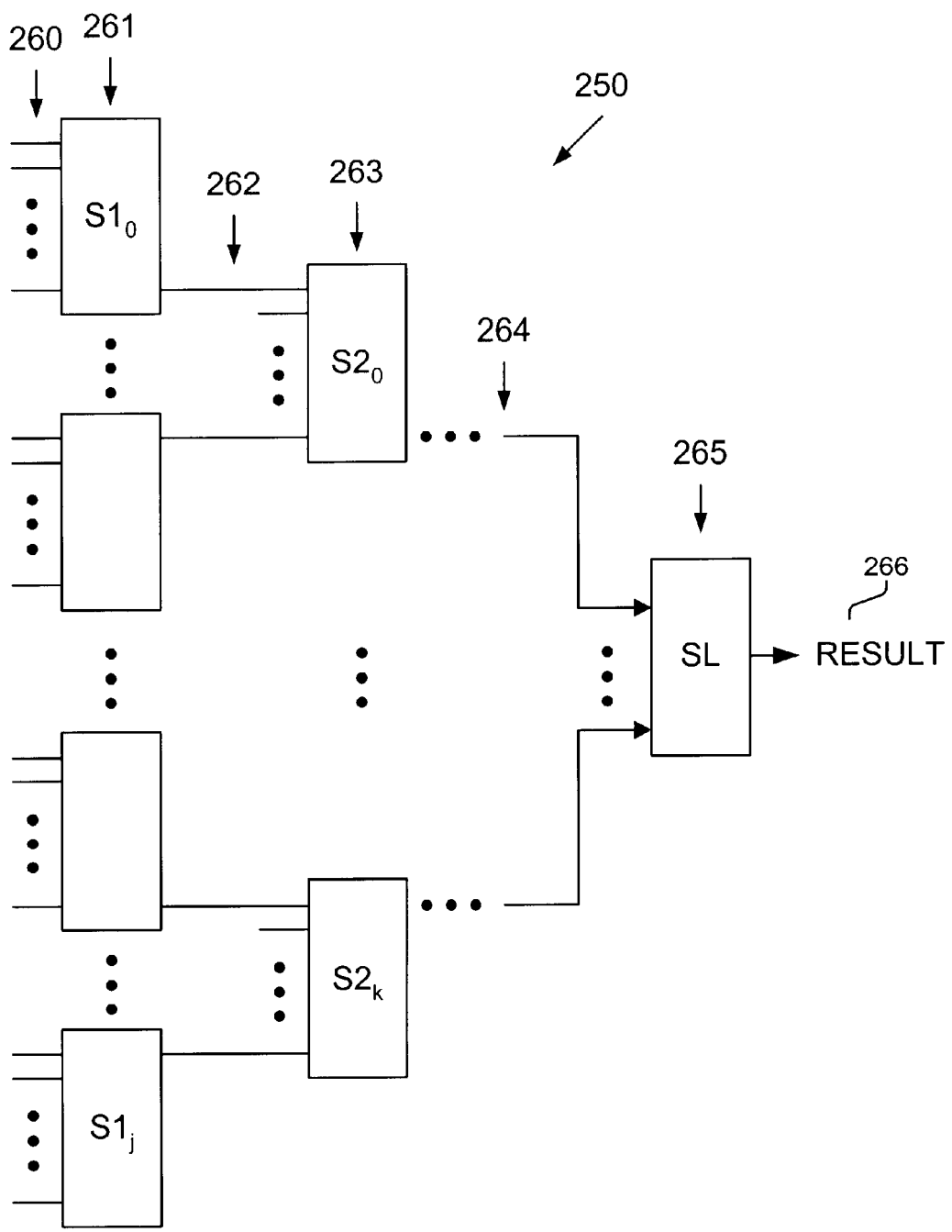

FIG. 2B illustrates one embodiment comprising a multi-stage cascaded circuit 250, have multiple requesting elements 260 coupled to first stage components 261, which are in turn coupled via links 262 to second stage components 263, and so on until the preceding stages 261–262 are coupled via links 264 to final stage 265. Final stage 265 indicates result 266, which corresponds to the next requesting element/candidate 260 in the round robin sequence.

The number of stages and requesting elements to each component of a stage is typically sized based on the number total elements to be serviced, and the implementation technology and clock speed. For example, a three-stage cascaded circuit 250 illustrated in FIG. 2B with each component of the first, second and third stages 261 having 16 inputs could be used to determine the next element in a round robin sequence within a single clock cycle for 4096 requesting elements (such as queues).

Figure 3:
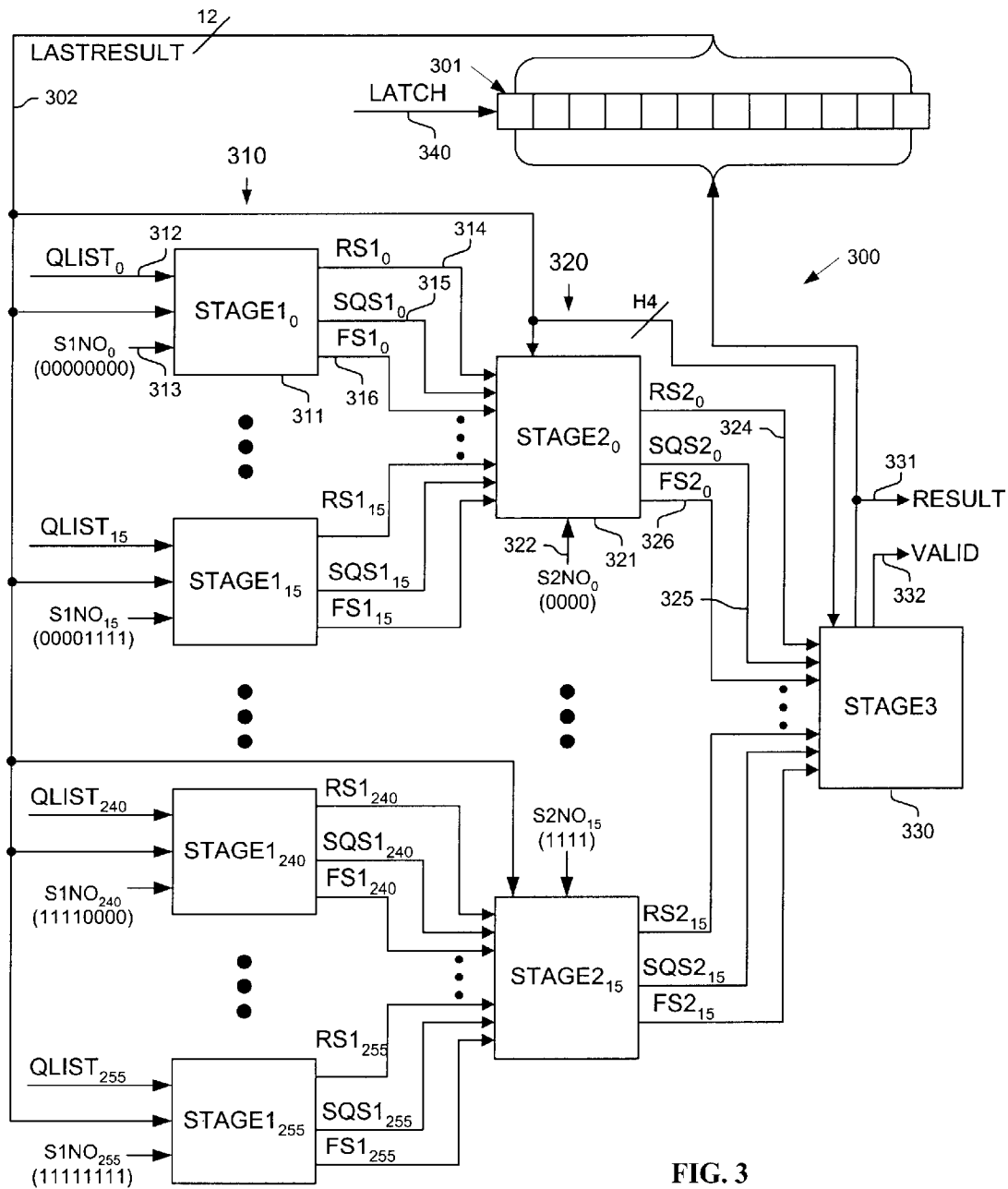
FIGS. 3–6 are block diagrams of a three stage embodiment.

One embodiment of a three stage circuit 300 is illustrated in FIG. 3. For simplicity of description, three stage circuit 300 is described in terms of accommodating up to 4096 requesting elements which are grouped into 256 first stage components 310, each having a QLIST identifying the requesting elements (e.g., queues), sixteen second stage components 320, and one final stage component 330 producing RESULT 331. Once again, the configuration of an embodiment is typically adjusted to accommodate the number of requesting elements (e.g., inputs), which may affect the embodiment's design, and result in a different number of stages or a different number of previous stage components connected to a subsequent component.

Round robin selection RESULT 331 is latched using latching signal 340 into buffer 301, which stores the value of a last result to be used determine the next RESULT 331. In other embodiments, other values are used to generate the last result signal 302. For example, any vector could be loaded into latch 301, a last result signal 302 could be generated from an output of a multiplexor to select between a last result or the value of another vector, the value of last result signal 302 could be generated from the output of some control logic or a received signal, or numerous other configuration could be used to generate last result signal 302 as understood by one skilled in the art.

Each of the first stage components 310, such as first stage component $STAGE1_0$ 311, receives the last result signal 302, an indication of the requesting elements (e.g., $QLIST_0$ 312 for $STAGE1_0$ 311), and an indication of its identity or address (such as $SINO_0$ 313 for $STAGE1_0$ 311). Each component of the first stage 310 then determines and identifies via a RS1 signal (e.g., $RS1_0$ 314) one of the multiple requesting elements as a candidate for the next round robin selection, a SOS1 signal (e.g., $SQS1_0$ 315) indicating whether or not the RS1 signal represents a valid next selection candidate, and a FS1 force signal (e.g., $FS1_0$ 316) which is used to force the selection of the respective RS1 signal as the next selection (i.e., RESULT 331). A requesting element is forced to be selected when the last result was in the same component of the stage and there is a subsequent or next requesting element in the round robin sequence.

The components of the second stage 320 operate in much the same fashion as that of the components of the first stage 310, and receive the outputs of multiple first stage components (specifically sixteen components of the first stage 310 as illustrated in FIG. 3). Each component of the second stage 320 produces a RS2 result (e.g., $RS2_0$ 324), SQS2 result RS2 signal valid (e.g. $SQS2_0$ 325), and FS2 force signal (e.g., $FS2_0$ 326). Additionally, each component of the second stage 320 receives an indication of its address (e.g., $S2NO_0$ 322 for component 321).

The RS2, SQS2, and FS2 output signals from the sixteen components of the second stage 320 are relayed to the third stage component 330, which then makes the final selection of the next round robin requesting element which is identified by RESULT signal 331 and valid signal 332.

Figure 4:
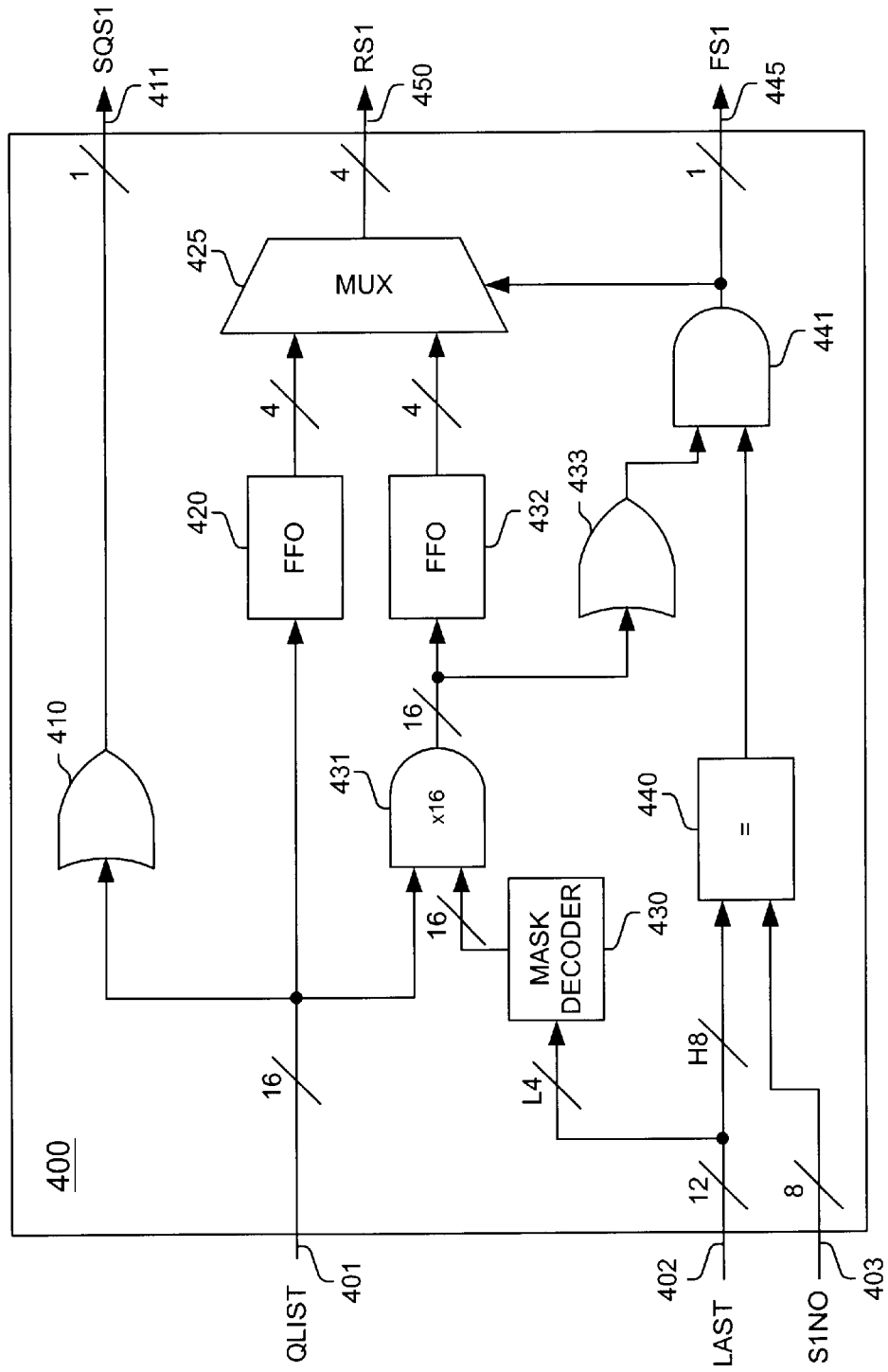

The operation of an embodiment of a first stage component 400 is further described in relation to FIG. 4. First stage component 400 receives an indication of the requesting elements coupled to it, such as via sixteen QLIST signal lines 401 which indicate a request for servicing by a corresponding line having a high voltage level. If one or more of the sixteen QLIST 401 signals are high, then OR gate 410 sets the SQS1 signal 411 high to indicate that component 400 has at least one element requesting service. Additionally, find first one component 420 determines the first in the sequence of requesting elements indicated by QLIST 401.

First stage component 400 further receives an indication of the last selected element via LAST signal 402. The bits representing the input elements of LAST signal 402 are then decoded by mask decoder 430 to produce a set of masking signals to mask all the elements prior to and including the previous selection. Sixteen AND gates 431 then mask the sixteen QLIST 401 signals which are then used to (1) identify the next potential next requesting element in the round robin sequence by find first element 432, and (2) to generate a force signal FS1 445 via the result of OR gate 433 and AND gate 441. AND gate 441 also takes as an input whether the specific first stage element 400 was used to generate the last result, as determined by comparing via comparitor 440 its address SINO signal 403 with the first stage address portion of the previous result (i.e., the high-order eight lines of LAST 402). FS1 force signal is also used by MUX 425 to select between the find first requesting element in the sequence or requesting element in the round robin sequence. For example, if the specific first stage component 400 was not used in selecting the last result, then the element identified to the next stage via RS1 result signal 450 would be the find first one result, else it would be the next round robin result.

Figure 5:
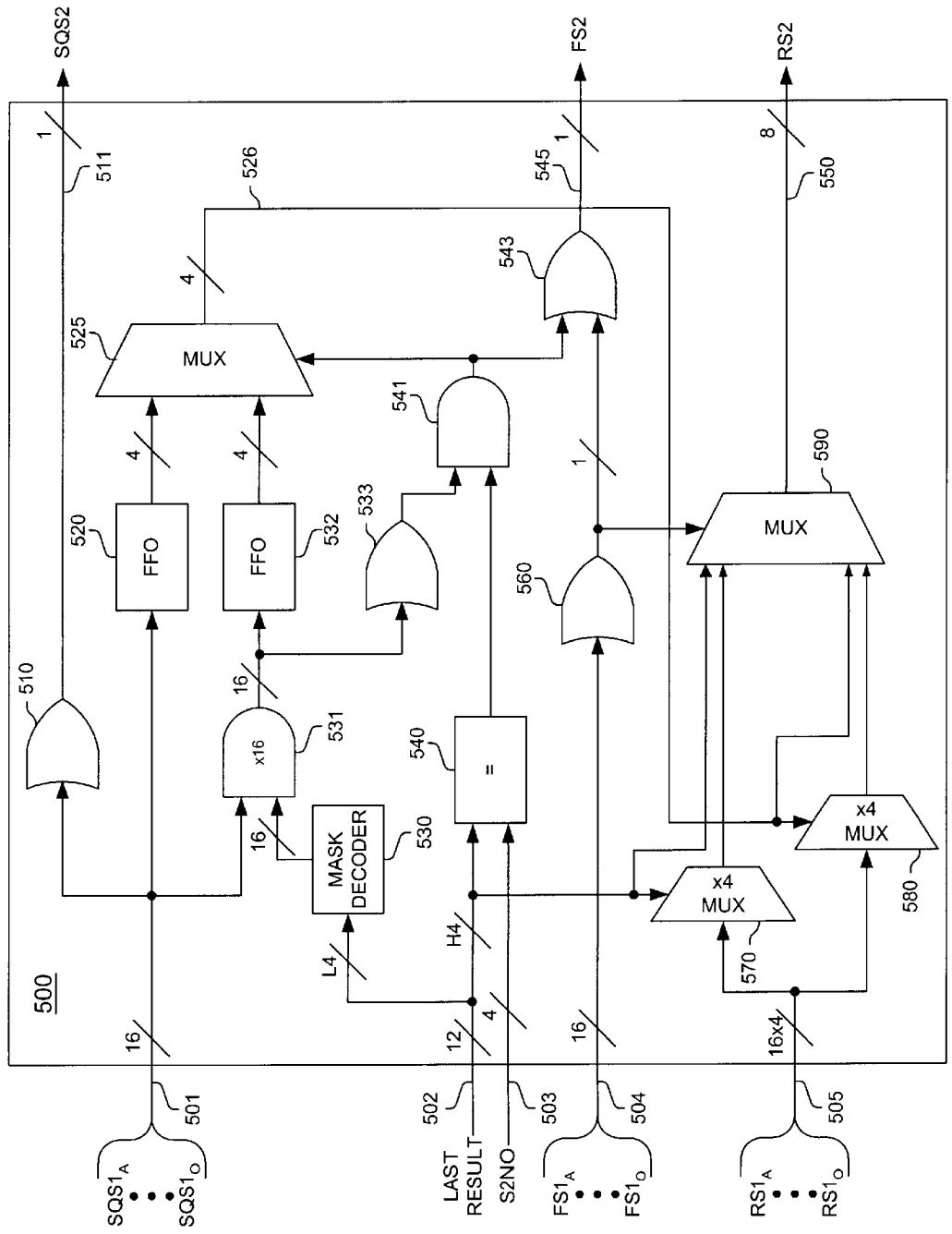

The operation of an embodiment of a second, or intermediate, stage component 500 is further described in relation to FIG. 5. Second stage component 500 receives an indication of which first stage components coupled to it have elements requesting service via SQS1 service request signals 501 which indicate a request for servicing by a corresponding line having a high voltage level. If one or more of the sixteen SQS1 service request signals 501 signals are high, then OR gate 510 sets the SQS2 signal 511 high to indicate that component 500 has at least one element/prior stage component requesting service. Additionally, find first one component 520 determines the first in the sequence of requesting elements/prior stage components indicated by SQS1 501.

Second stage component 500 further receives an indication of the last selected element via LAST signal 502. The bits representing the prior stage components of LAST signal 502 are then decoded by mask decoder 530 to produce a set of masking signals to mask all the prior stage components prior to and including the previous selection. Sixteen AND gates 531 then mask the sixteen SQS1 501 signals which are then used to (1) identify the next potential next requesting prior stage component in the round robin sequence by find first element 532, and (2) to generate a force signal FS2 545 via the result of OR gate 533, AND gate 541 and OR gate 543. AND gate 541 also takes as an input whether the specific first stage element 500 was used to generate the last result, as determined by comparing via comparitor 540 its address S2NO signal 503 with the second stage address portion of the previous result (i.e., the high-order four lines of LAST 502). OR gate 543 also takes as input the output of OR gate 560 which generates a high signal if any of the prior stage FS1 force signals 504 are high. The output of AND gate 541 is also used by MUX 525 to generate signal 526 by selecting between the find first requesting element in the sequence or requesting element in the round robin sequence. For example, if the specific first stage component 500 was not used in selecting the last result, then the first stage component would be the find first one result, else it would be the next round robin result.

The lower portion of component 500 as illustrated in FIG. 5 is used to select one of the sixteen RS1 signal 505 generated by a coupled first stage component 400 (FIG. 4) and to indicate the address of the selected first stage component. If a force signal FS1 signal 504 is received as determined by OR gate 560, then the forced result (selected by the four MUXs 570 plus the highest four lines of the LAST RESULT 502) is selected via MUX 590, else the non-forced result (selected by the four MUXs 580 plus the find first one or round robin result of signal 526) is selected. The RS2 result 550 of MUX 590 is then relayed to the next stage or final/third stage 600 of FIG. 6 in this exemplary embodiment.

Figure 6:
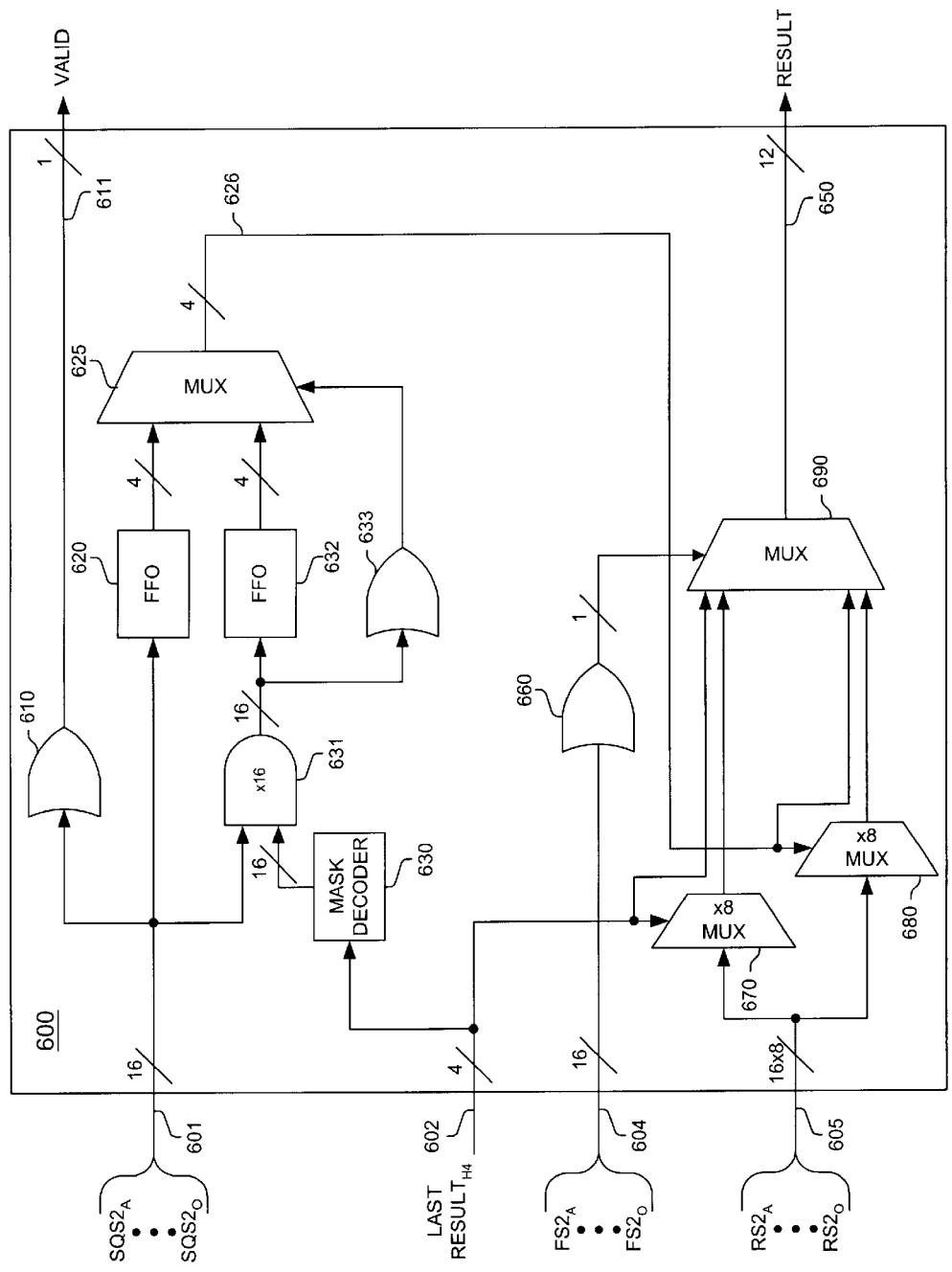

The operation of an embodiment of a final stage component 600 (i.e., the third stage of this exemplary embodiment) is further described in relation to FIG. 6. Third stage component 600 receives an indication of which second stage components coupled to it have elements requesting service via SQS2 service request signals 601 which indicate a request for servicing by a corresponding line having a high voltage level. If one or more of the sixteen SQS2 service request signals 601 signals are high, then OR gate 610 sets the VALID signal 611 high to indicate that component 600 has at least one element requesting service. Additionally, find first one component 620 determines the first in the sequence of requesting elements/prior stage components indicated by SQS2 signals 601.

Third stage component 600 further receives an indication of the last selected element via LAST signal 602. The bits representing the prior stage components of LAST signal 602 are then decoded by mask decoder 630 to produce a set of masking signals to mask all the prior stage components prior to and including the previous selection. Sixteen AND gates 631 then mask the sixteen SQS2 601 signals which are then used to (1) identify the next potential next requesting prior stage component in the round robin sequence by find first element 632, and (2) to generate using OR gate 633 a selection signal for MUX 625 to use in selecting between the find first one result of FFO 620 or the next in the round robin sequence result of FFO 632.

The lower portion of component 600 as illustrated in FIG. 6 is used to select one of the sixteen RS2 signals 605 generated by a coupled previous or second stage component 500 (FIG. 5) and to indicate the address of the selected first stage component. If a force signal FS1 signal 604 is received as determined by OR gate 660, then the forced result (selected by the four MUXs 670 plus the highest four lines of the LAST RESULT 602) is selected via MUX 690, else the non-forced result (selected by the four MUXs 680 plus the find first one or round robin result of signal 626) is selected. RESULT 650 of MUX 690 then indicates the next element requesting service in the round robin sequence.

Figure 7:
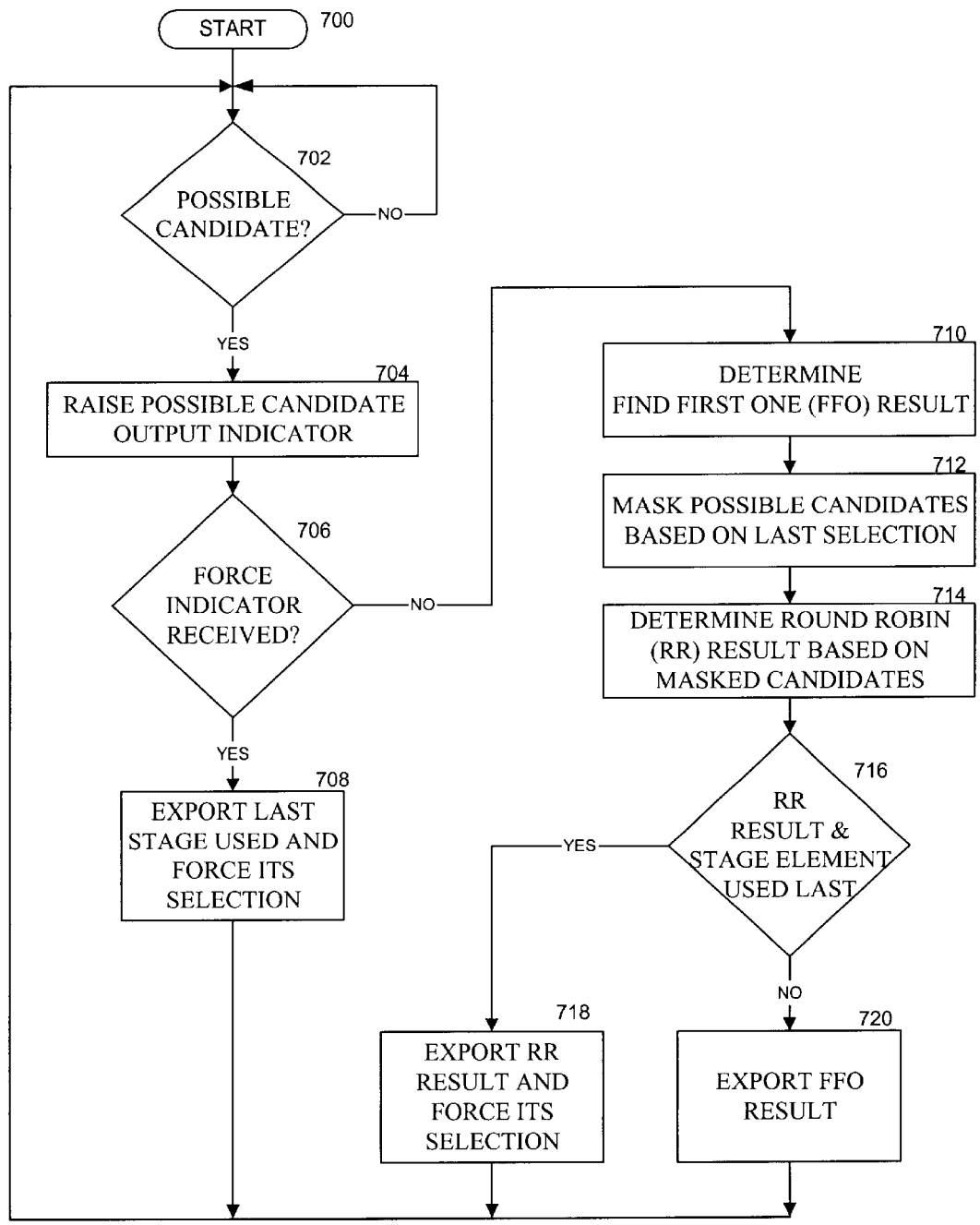
FIG. 7 is a flow diagram illustrating the process performed by an exemplary stage of a cascaded implementation.

FIG. 7 illustrates a process employed by one embodiment of a component of a stage of a cascaded process for determining a next candidate requesting service in a round robin sequence. Processing begins at process block 700 and proceeds to process block 710, where until the group or element determines that it has a possible candidate ,for selection (e.g., an input candidate or prior stage requests servicing), it loops upon itself. Then, in process block 704, an output indicator is raised indicating to a next stage that it is requesting service or that the result produced is valid. Next, in process block 706, if a force indicator is received (which would always be false for a first stage), then the last stage used is exported in process block 708. Otherwise, in process block 710, a find first one result is determined. In process block 712, the possible candidates are masked and then in process block 714, a find first one operation is performed to find the next possible candidate in the round robin sequence. Next, if there is a round robin result generated in process block 714 and this current component was used last, then in process block 718, the round robin result is used and its selection is forced. Otherwise, in step 720, the find first one result is exported for use. Processing then returns to process block 702.

For simplicity of understanding, some embodiments have been described herein using one type of circuitry, components and/or elements. As is apparent to one skilled in the art, numerous other embodiments are possible which use one or more of a wide variety of data structures and elements in keeping with the scope and spirit of the invention.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A cascaded circuit to identify a next element in a round robin sequence, the cascaded circuit comprising:

a plurality of first stage components configured to receive an indication of a starting position and to receive a plurality of indication signals of elements requesting selection, the elements requesting selection being a subset of a plurality of elements which may request selection, each of the plurality of first stage components including an identification circuit to identify one of the plurality of requesting elements to a second stage component;

the second stage component, coupled to the plurality of first stage components, configured to receive an indication of the starting position and to receive servicing request indications from the plurality of first stage components, the second stage component including a selection circuit to select the next element from among the elements requesting selection identified as identified by said servicing request indications;

wherein the identification circuit includes a find first one sub-circuit, a round robin sub-circuit, and a selection device to select between the find first one sub-circuit and the round robin sub-circuit;

wherein the round robin sub-circuit includes masking circuitry and a second find first one sub-circuit.

2. The cascaded circuit of claim 1, wherein the selection circuit includes a selection circuit find first one sub-circuit.

3. The cascaded circuit of claim 2, wherein the selection circuit includes a selection circuit round robin sub-circuit and a selection circuit selection device to select between the selection circuit find first one sub-circuit and selection circuit the round robin sub-circuit.

4. The cascaded circuit of claim 3, wherein the selection circuit round robin sub-circuit includes selection circuit masking circuitry and a second selection circuit find first one sub-circuit.

5. The cascaded circuit of claim 1, wherein the starting position corresponds to to an element identified last time by the cascaded circuit.

6. The cascaded circuit of claim 1, wherein the selection circuit includes means for selecting the next element from among the elements requesting selection identified by the plurality of first stage components.

7. The cascaded circuit of claim 1, wherein the selection device includes means for identifying whether to select between the find first one sub-circuit and the round robin sub-circuit based on said received indication of the starting position and said indication signals of elements requesting selection; and wherein the selection device is responsive to said means for identifying whether to select between the find first one sub-circuit and the round robin sub-circuit.

* * * * *

UNITED STATES PATENT AND TRADEMARK OFFICE
CERTIFICATE OF CORRECTION

PATENT NO. : 6,807,187 B1
DATED : October 19, 2004
INVENTOR(S) : Dalit Sagi

It is certified that error appears in the above-identified patent and that said Letters Patent is hereby corrected as shown below:

Column 5,
Line 52, replace "SINO" with -- S1NO --.

Column 7,
Line 24, replace "candidate ,for" with -- candidate for --.

Column 8,
Line 41, replace "to to an element" with -- to an element --.

Signed and Sealed this

Twentieth Day of September, 2005

JON W. DUDAS
*Director of the United States Patent and Trademark Office*